United States Patent [19]

Schiff

[11] Patent Number: 4,587,661
[45] Date of Patent: May 6, 1986

[54] APPARATUS FOR SYNCHRONIZING SPREAD SPECTRUM TRANSMISSIONS FROM SMALL EARTH STATIONS USED FOR SATELLITE TRANSMISSION

[75] Inventor: Leonard N. Schiff, Lawrenceville, N.J.

[73] Assignee: RCA Corporation, Princeton, N.J.

[21] Appl. No.: 472,256

[22] Filed: Mar. 4, 1983

[51] Int. Cl.⁴ .............................................. H04K 1/04
[52] U.S. Cl. ........................................ 375/1; 375/115; 370/104
[58] Field of Search ................... 375/1, 115, 106, 109; 370/104, 107; 343/5 PN; 455/12; 371/42, 47

[56] References Cited

U.S. PATENT DOCUMENTS

| | | | |
|---|---|---|---|
| 3,858,007 | 12/1974 | Ganssmantel | 370/104 |
| 3,982,075 | 9/1976 | Jefferis et al. | 370/104 |
| 3,995,111 | 11/1976 | Tsuji et al. | 375/115 |
| 4,004,225 | 1/1977 | Ganssmantel | 370/104 |
| 4,005,266 | 1/1977 | Lehr et al. | 375/107 |
| 4,010,420 | 3/1977 | Reiner et al. | 370/104 |
| 4,095,226 | 6/1978 | Kratzer | 375/115 |
| 4,117,267 | 9/1978 | Haberle et al. | 370/104 |
| 4,270,211 | 5/1981 | Schlichte | 375/107 |
| 4,292,683 | 9/1981 | Jueneman | 370/104 |

Primary Examiner—Robert L. Griffin
Assistant Examiner—Stephen Chin
Attorney, Agent, or Firm—Joseph S. Tripoli; Robert L. Troike; William H. Meise

[57] ABSTRACT

A low-power, spread spectrum synchronized communication system employing a satellite which continuously and iteratively re-transmits a PRS signal $PRS_m$ from a master earth station having a chip rate $C_m$ and a bit rate $B_m$ and comprising a plurality of ground stations each including a transmitter for transmitting a first PRS signal ($PRS_G$) unique thereto and having a first chip rate $C_G$ and a first bit rate $B_G$ and a receiver for receiving and identifying $PRS_G$ after being returned by the satellite as $PRS_{Gr}$ with a chip rate $C_{Gr}$ and a bit rate $B_{Gr}$. Also provided is a phase difference detector responsive to $C_m$ and $C_{Gr}$ to periodically produce a signal representative of the change of phase difference thereof and a frequency changing circuit responsive to such signal to change the chip rate $C_{Gr}$ by an amount which will cause the phase of $C_{Gr}$ to approach the phase of $C_m$ at a given rate.

5 Claims, 10 Drawing Figures

APPARATUS FOR SYNCHRONIZING SPREAD SPECTRUM TRANSMISSIONS FROM SMALL EARTH STATIONS USED FOR SATELLITE TRANSMISSION

This invention relates generally to communications systems employing a plurality of earth stations and a common satellite transponder and more particularly to such a system employing spread spectrum transmissions which are all synchronized with each other from a common source located preferably at a master earth station and observable to all other stations by monitoring the satellite transponder.

BACKGROUND OF THE INVENTION

In prior art systems earth stations can transmit data signals to remote earth stations via a satellite transponder. Similarly, earth stations can receive transmissions from distant earth stations via a satellite. In these systems many earth stations access the same satellite transponder so that the transponder is being used in a multiple access mode. In the prior art, several multiple access techniques are available. The two techniques most commonly employed are time division multiple access (TDMA) and frequency division multiple access (FDMA). In a system using relatively small earth station antennas, (from 3-4 feet in diameter) both of the foregoing techniques present substantial difficulties. The basic problem with both TDMA and FDMA lies in their interference protection. Small earth stations of the intended size experience substantial interference on reception and on transmission both in terms of interfering with other services or being interfered with because the small antenna size implies low antenna selectivity, i.e., the bore site radiated power relative to the off-axis radiated power.

In a TDMA system the data to be transmitted is buffered and then sent in bursts during a relatively short time interval or window on a periodic basis. Consequently, the average power over the entire period may be low because most of the time no transmission occurs. But during the narrow time windows, when data is being transmitted, the power is relatively high.

In FDMA, the data is transmitted continuously, but since the radiated signal is confined to a small section in a frequency band (so that others can use adjacent bands) the power is concentrated in portions of the frequency spectrum rather than in time as is the case with TDMA transmission.

Hence, especially in terms of the interference potentials from the earth station into other terrestrial services or to adjacent satellites, the concentration of transmitter power in either the time or frequency domains is undesirable. On the other hand, spread spectrum transmission has a unique distinction in that the power is not concentrated in either time or frequency. Many users can use the same bandwidth simultaneously in the spread spectrum multiple access mode (SSMA). The power produced by a spread spectrum transmitter is relatively constant over time and is spread out over a large frequency range. Depending upon how large such frequency range is, the actual level of any given signal can be lower than the thermal noise received at a given receiver with which the spread spectrum transmission might interfere. Hence, spread spectrum is an extremely desirable modulation method for multiple access of small earth stations.

The spread spectrum transmission employed in the present invention is the so-called direct sequence method. In the direct sequence method, a bit of information (data bit) is transmitted as a phase shift keyed transmission of a carrier with the phase shift keying being at an extremely rapid rate compared to the data bit rate since there are many time elements per bit. These time elements are conventionally called chips. The signal transmitted in the direct sequence method technique has a unique shift register pattern associated with it, usually called a pseudo random sequence (PRS). The PRS signal is a sequence of high and low level signals defined by the chips each of which is of equal time length, arranged in a random fashion, and representing the phase shifting of the carrier. If a binary 1 is to be transmitted the uninverted PRS signal is employed to modulate the carrier. If a binary 0 is to be transmitted the inverted PRS signal modulates the carrier.

In a typical application of the direct sequence method employing a PRS signal there might be 500-1000 chips in the PRS pattern. The bandwidth occupied by the signal is directly determined by the chip rate which is, in effect, a pseudo data rate. A receiver receiving a PRS signal from a given transmitter has the same PRS pattern stored therein. This stored PRS pattern can be employed to decode and extract the transmitted data even when there are many other stations using the same frequency band at the same time because the other stations are all using PRS signals of different patterns.

While the spread spectrum technique is extremely desirable from the point of view of reducing interference probability from a transmitting station and also from the point of view of reducing interference potential on reception, the efficiency of multiple access spread spectrum as it is conventionally used, i.e., with each station being asynchronous with each other station, is quite low compared with either TDMA and FDMA. In both TDMA and FDMA the signals transmitted by the individual stations are orthogonal to one another, i.e., they either occur at different times or in different frequency bands.

In conventional spread spectrum the waveforms are not orthogonal to each other and a station receiving a desired spread spectrum transmission will also see many other spread spectrum transmissions. While the other spread spectrum transmissions will appear as noise such noise forms a background which makes error probability high unless the number of simultaneous users in the band is kept reasonably low. The primary reason for the above-mentioned difficulties in the prior art spread spectrum systems results from the fact that the transmissions are not synchronized with respect to a common reference.

It is a primary purpose of the present invention to synchronize all of the chips and all of the bits of all transmission sequences of the various transmitters, which will result in the orthogonality of all such sequences when the sequences are properly designed. This will provide a multiple access efficiency of spread spectrum as high as for TDMA and FDMA systems. A further advantage of the present invention is that the interference protection is greater than that obtainable with the more conventional TDMA and FDMA systems and similar to that of ordinary, unsynchronized spread spectrum systems.

SUMMARY OF THE INVENTION

In accordance with a preferred form of the invention, there is provided, in a communications systems employing a satellite for receiving pseudo random sequence (PRS) signals $PRS_G$ having a chip rate $C_G$ and a bit rate $B_G$ from a given ground station and for re-transmitting such PRS signals $PRS_{Gr}$ having a chip rate $C_{Gr}$ and a bit rate $B_{Gr}$, and logic for iteratively generating a master PRS signal $PRS_m$ having a chip rate $C_m$ and a bit rate $B_m$, logic for synchronizing $C_{Gr}$ with $C_m$ and $B_{Gr}$ with $B_m$ at the given ground station including a transmitter for transmitting $PRS_G$, a receiver for receiving and identifying $PRS_{Gr}$ after being returned by the satellite, a second receiver for receiving and identifying $PRS_m$, and a phase comparator responsive to $C_{Gr}$ and $C_m$ to produce a signal representative of the phase difference thereof every time period $\tau$. Also provided is phase shifting logic responsive to such signal to change the chip rate $C_{Gr}$ such that the phase of $C_{Gr}$ will approach the phase of $C_m$ at a given rate.

DESCRIPTION OF PREFERRED EMBODIMENT

Figure 1:
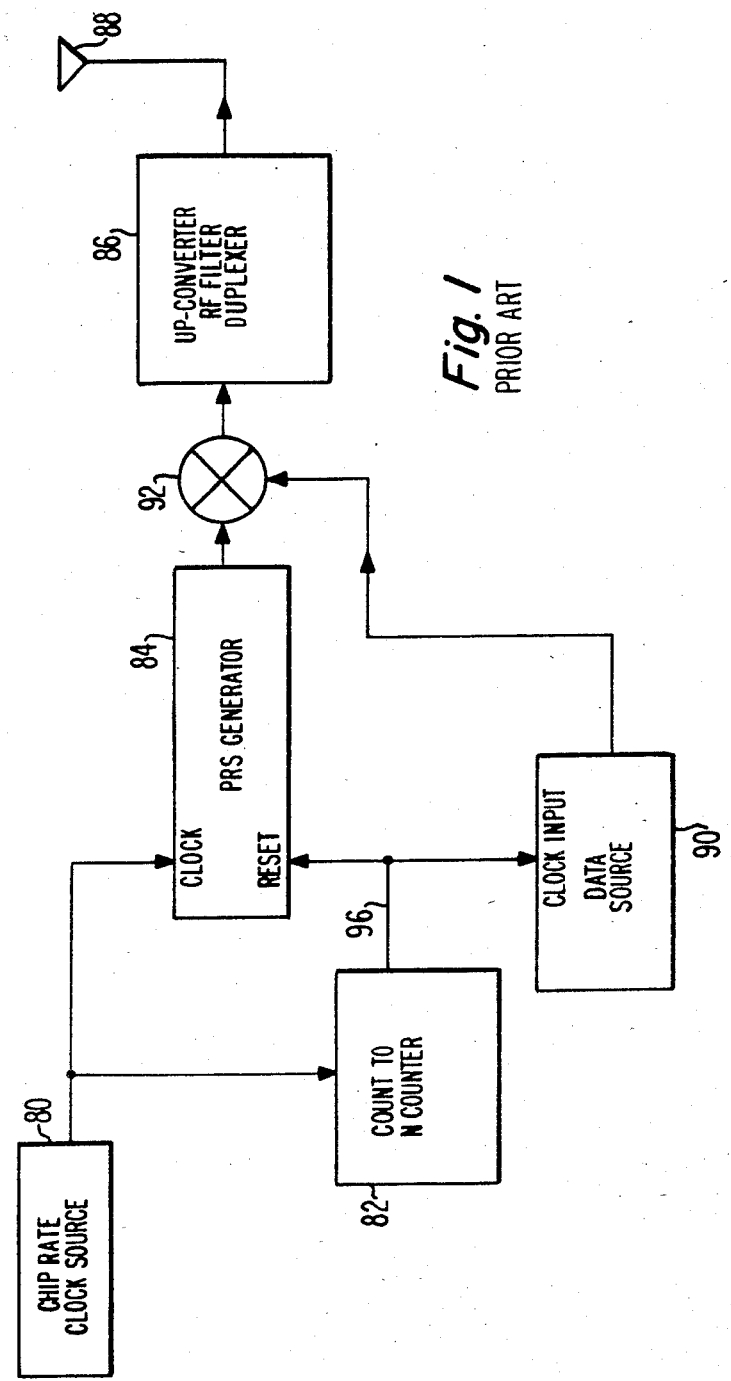
FIG. 1 is a block diagram of a prior art transmitter located at a given ground station.

The improvement described herein which allows synchronization of transmissions from various small earth stations is used in conjunction with conventional spread spectrum transmitters and receivers. It is advantageous, therefore, to first describe a prior art spread spectrum transmitter and receiver. A prior art transmitter portion is shown in FIG. 1 and a prior art receiver in FIG. 2. The transmitter logic of FIG. 1 is relatively simple and consists primarily of a chip rate clock source 80 which supplies clock pulses to counter 82 and to PRS generator 84 which in turn iteratively generates a predetermined PRS signal. Such PRS signal is supplied to one input of Exclusive OR (XOR) gate 92. The bit output of data source 90 is supplied to the other input of XOR gate 92. Synchronization between the output of data source 90 and PRS generator 84 is maintained by the count-of-0 output from counter 82. Depending upon whether a binary 0 or a binary 1 (low or high level signals) is supplied from data source 90 the XOR gate 92 will either invert or not invert the PRS signal supplied from PRS generator 84, thus indicating an encoded binary 0 or binary 1. The output of XOR gate 92 is supplied to logic 86 which processes the signal for transmission.

Figure 2:
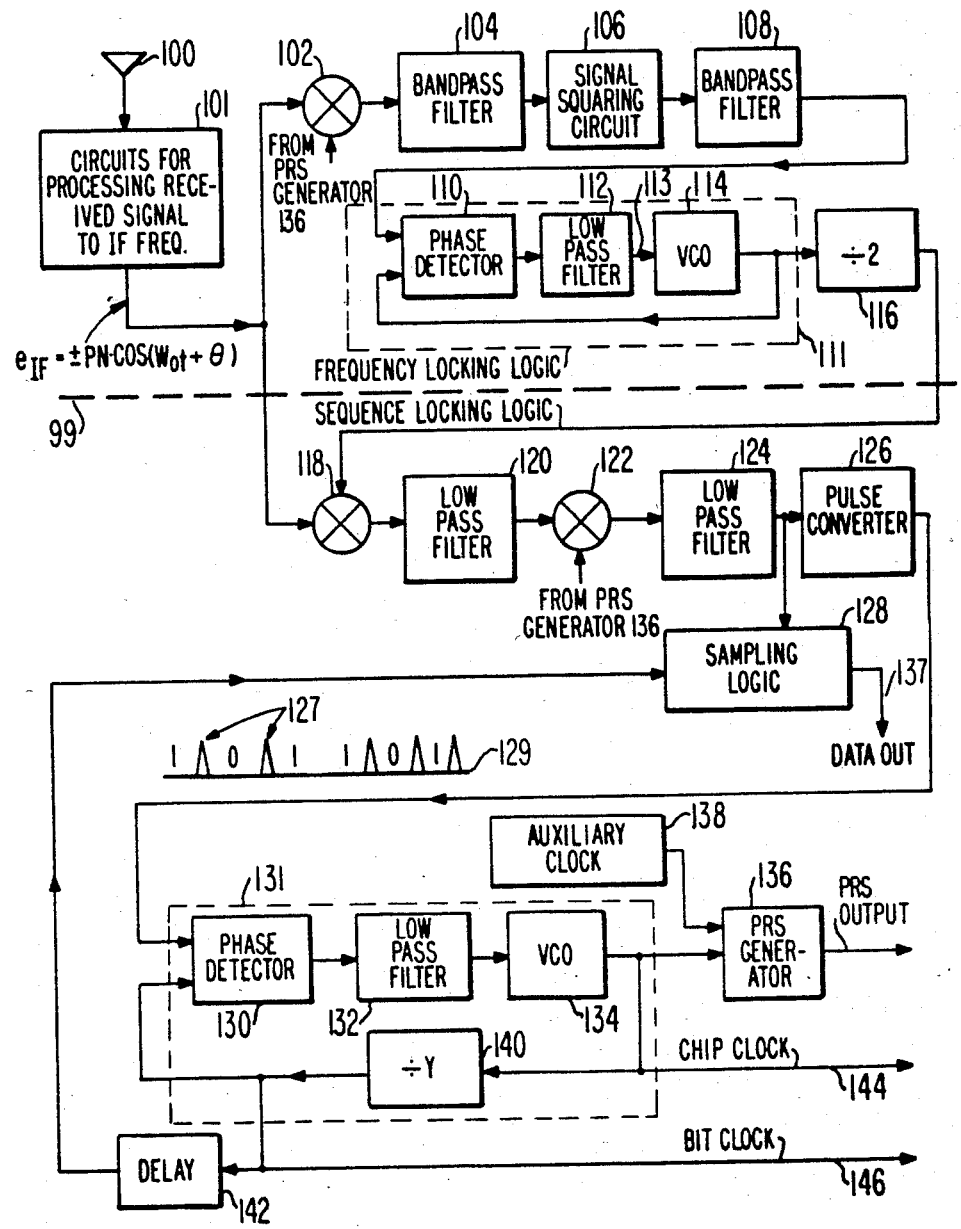
FIG. 2 is a block diagram of a prior art receiver located at the given ground station.

A portion of a prior art receiver is shown in FIG. 2. A transmitted PRS signal is received via antenna 100 and supplied to circuits within block 101 for processing the received signal down to the IF frequency. Such signal can then be defined by the following expression.

$$e_{IF} = \pm PN \cos(\omega_0 t + \theta) \quad \text{(Exp. 1)}$$

where $\pm PN$ is the PRS modulated by one data bit which is either $+1$ or $-1$ and the expression $\cos(\omega_0 t + \theta)$ is the intermediate carrier frequency portion of the signal at that point in the system.

The signal of Exp. 1 is supplied to one input of mixer 102, while the other input, which receives the locally generated PRS signal, is assumed to have the same pattern as the received PRS signal.

The function of mixer 102 is to strip off the PRS signal from the received IF signal. Next, to remove the unwanted frequency components, the output of mixer 102 is passed through bandpass filter 104 and subsequently squared in squaring circuit 106 to eliminate the negative component of the received signal. This provides a doubled frequency signal defined by the following expression:

$$\cos(2\omega_0 t + 2\theta) \quad \text{(Exp. 2)}$$

The signal of Exp. 2 is then supplied to one input of phase detector 110 of phase locked loop (PLL) system 111, the output of phase detector 110 being supplied through low pass filter 112 and then to the frequency control input 113 of VCO 114. To complete the loop the output of VCO 114 is supplied back to the other input of phase detector 110. The function of the phase locked loop circuit 111 is to provide a filter, i.e., to generate an output signal from VCO 114 having a very narrow bandwidth. To obtain the original frequency, the output of VCO 114 is divided by 2 in frequency divider 116 and then supplied to one input of a second mixer 118, the other input thereof receiving the IF input signal (Exp. 1) from source 100.

It should be noted that in FIG. 2 the logic just described, which is above the dashed line 99 is essentially a frequency locking circuit to produce the frequency supplied to the input of mixer 118 from divider 116. The logic below the dotted line 99 is the sequence locking logic and, as will be seen later, provides chip clock pulses on output lead 144 and bit clock pulses on output lead 146.

The function of mixer 118 is to strip the intermediate carrier frequency $\cos(\omega_0 t + \theta)$ from the supplied signal (Exp. 1), leaving only the received baseband PRS signal plus some undesired frequencies which are removed by low pass filter 120. Such baseband PRS signal is then supplied to one input of mixer 122, with the locally generated PRS signal being supplied to the other input of mixer 122. It should be noted that the locally generated PRS signal supplied to mixer 122 is the same locally generated PRS signal supplied to mixer 102.

As discussed earlier the received PRS signal can be either an uninverted PRS signal or an inverted PRS signal representing respectively a binary 1 or a binary 0. Accordingly, when mixed in mixer 122 with the non-inverted locally generated PRS signal a non-inverted received PRS signal will result in a high-level output signal from mixer 122, and a received inverted PRS signal will result in a low level signal supplied from mixer 122 when mixed with the non-inverted locally generated PRS signal. Thus mixer 122 outputs a series of high and low level signals each having a time duration equal to the time duration of the received PRS signals and representing the bits which were represented by the non-inverted and the inverted PRS signals. Such two-level signal is supplied to low pass filter 124 to remove undesired higher frequencies and is then supplied to a pulse converter 126 which generates a pulse at every transition from 1 to 0 or 0 to 1. Such transition pulses are designated generally by the reference character 127 in the small timing waveform 129 of FIG. 2. These transition pulses 127 are supplied to one input of phase detector 130, the other input of which receives the output of divide-by-Y circuit 140 which is a portion of a phase locked loop (PLL) system 131. Another component of phase lock loop system 131 is low pass filter 132 which filters the output of phase detector 130 and supplies a frequency control signal to the frequency control 133 input of VCO 134. The output of VCO 134 is supplied through divider 140 which divides the output frequency thereof by Y and supplies such divided down signal frequency to the other input of phase detector 130. Thus, the output of VCO 134 has a frequency equal to the chip rate frequency and is, in fact, the chip clock pulse train indicated on output lead 144. Such chip rate clock pulses are supplied to PRS generator 136 which generates the locally generated PRS signal supplied both to mixers 102 and 122. The purpose of the PLL arrangement 131 is to deliver a steady stream of bit and chip pulses since the original input stream 127 is erratic (a pulse occurs only on transition).

Since Y is the number of chips in a bit the output of the divide-by-Y circuit 140 is at the bit rate and is supplied through delay means 142 back to sampling logic 128 which functions to sample the output of low pass filter 124 at every transition of the output from delay 142. It will be recalled that the output of low pass filter 124 is a two level signal representing the binary 1's and 0's received by the system. Such sampling is required since the transmission of two adjacent 1's or two adjacent 0's at the output of low pass filter 124 are at the same level and difficult to identify. By means of delay circuit 142 and sampling means 128 the nature of each received bit is definitively identified and supplied to a data output lead 137 for use by some appropriate utilization means, not shown.

It is of importance to note that the chip clock pulses and the bit clock pulses appearing on output terminals 144 and 146 of FIG. 2 are employed in the invention to correct the phase of the chip and bit clock pulses of the signals being transmitted from the particular earth station being considered.

Figure 3:
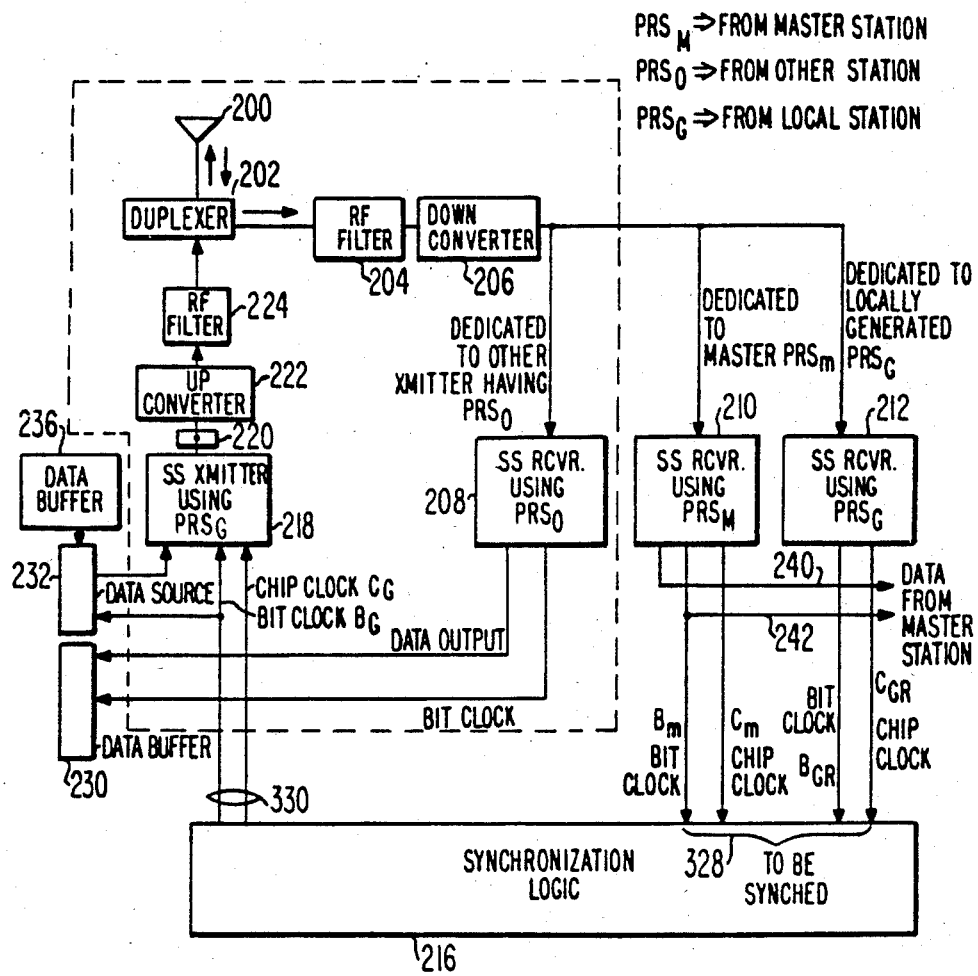
FIG. 3 is a block diagram of a ground station of the present invention.

Reference is now made to the block diagram of FIG. 3 which shows in broad block diagram form the basic concept of the invention. In FIG. 3 there are three receivers 208, 210 and 212, each one similar to the receiver of FIG. 2, but each receiving different PRS signal patterns. However, only two of the receivers 210 and 212) are actually a part of the inventive concept. The third receiver 208 is shown only to illustrate that a third receiver is used to receive messages from other earth stations via the satellite. The two receivers 210 and 212 are the receivers employed to establish chip and bit synchronism with other receivers in the system with respect to a common reference, which is the basic purpose of the invention.

In FIG. 3 a transmitter 218 generates a PRS signal $PRS_G$ under control of chip clock pulses and bit clock pulses supplied thereto via leads 330 in the manner described generally in the discussion of FIG. 1.

The generated $PRS_G$ signal is supplied through an attenuator 220 (which is employed only during the synchronization acquisition mode) and subsequently to up-converter 222, RF filter 224, diplexer 202 (also known as a duplexer), and then transmitted via antenna 200 in a well known manner. The diplexer 202 functions to distinguish between transmitted signals and received signals. Upon reception a received signal is diverted by means of diplexer 202 to a second path including RF filter 204, down converter 206, and then to the receivers 208, 210 and 212 in parallel.

The chip and bit clock pulse trains generated in receivers 210 and 212 are extracted from the received signals in exactly the same manner as discussed in connection with the prior art receiver of FIG. 2. The purpose of the invention is to synchronize the chip clock $C_{Gr}$ with the chip clock $C_m$ and the bit clock $B_{Gr}$ with the bit clock $B_m$ at the output of the receivers 210 and 212, which is done by the synchronization logic 216 of FIG. 3. More specifically, the logic 216 responds to the bit and chip clocks supplied from receivers 210 and 212 to generate the bit and chip clocks for transmitter 218 so that the resultant $PRS_G$ generated by transmitter 218 and transmitted to the satellite will be received back with its chip and bit pulses ($C_{Gr}$ and $B_{Gr}$) being phase locked (at the output leads 328 of receivers 210 and 212) with the chip and bit clock pulses ($C_m$ and $B_m$) of the master PRS signal generated by and transmitted from the satellite and received by receiver 210. The foregoing of course implies that the chip and bit clock pulses appearing at the outputs of receivers 210 and 212 are also sychronized as they leave the satellite.

It can be seen that if all of the earth stations perform the same synchronization process any earth station can receive a transmission from any other station via the satellite and will be synchronized with such transmission. All messages received from all earth stations at a given receiver will be received time synchronously with each other. It should be noted that in terms of absolute time, however, the transmission of a message by any given earth station will usually occur at a different time than the transmission of the same message by another earth station since the two earth stations usually will be at different distances from the satellite from which all messages are time referenced.

Figure 4:
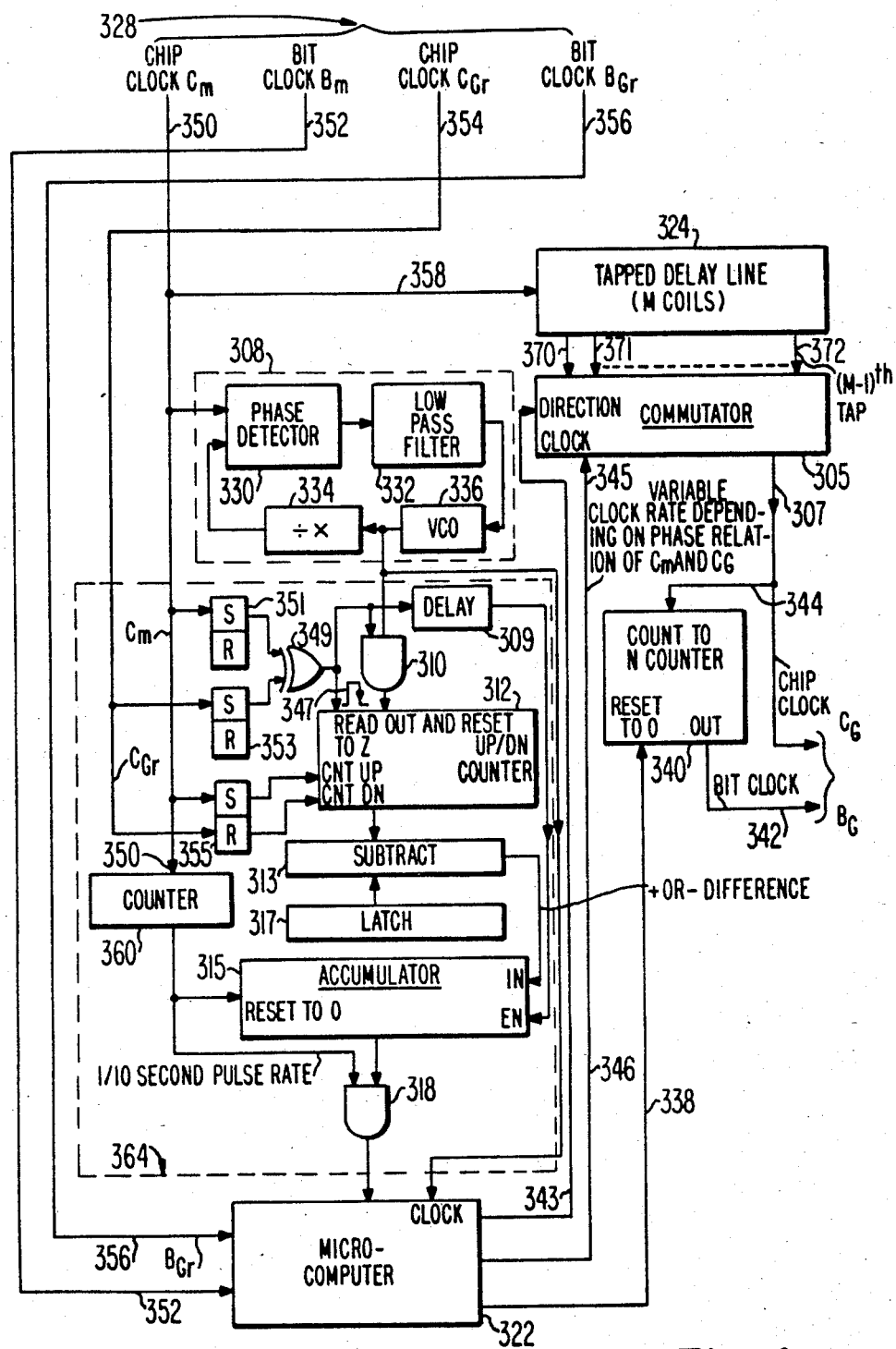
FIG. 4 is an expanded combination block and logic diagram of the synchronization logic 216 of FIG. 3.

Referring now to FIG. 4 there is shown a detailed block and logic diagram of one suitable form of logic suitable to perform the function of block 216 of FIG. 3. In FIG. 4 the four inputs 328 correspond to the bit and chip clock pulses appearing at the output of receivers 210 and 212 of FIG. 3. The general object of the structure of FIG. 4 is as follows. The phase difference ($\Delta\phi$) of chip clock pulses $C_m$ and $C_{Gr}$ is measured and a clock in the form of counter 312 is set to running during the period between the occurrence of chip clock pulse $C_{GR}$ and a subsequent chip clock pulse $C_m$, assuming chip clock pulse $C_{Gr}$ is lagging chip clock pulse $C_m$. If $C_{Gr}$ is leading chip clock pulse $C_m$ then the counter 312 is again set to running but for the leading phase relationship rather than the lagging as will be discussed in more detail later.

The count value in counter 312 is accumulated over a period of time as, for example 1/10 of a second, and then supplied to computer 322 which functions to interpret the total accumulated count value in counter 312 and then supply a third clock pulse train of variable frequency via lead 346 to clock input 345 of commutator 305 which responds thereto to commutate the tap outputs 370, 371–372 of tapped delay line 324 to successively connect said tapped outputs to an output lead 307. The input to tapped delay line 324 is the chip clock pulses $C_m$ supplied thereto via lead 358.

It is well known that by successively and cyclically connecting the tapped output of tapped delay line 324 to output lead 307 that a phase shift is introduced into chip clock pulses $C_m$. A continuous phase shift is defined as a change in frequency. Thus, by changing the clock pulse rates supplied to the clock input 345 of commutator 305 the frequency rate of chip clock $C_m$ is changed. As will be understood more clearly later such changes in frequency can be continued until chip clock $C_m$ is, in fact, phase synchronized with chip clock $C_{Gr}$ at the output of receivers 210 and 212 of FIG. 3. Perfect synchronization will occur when the count value accumulated in accumulator 315 reaches 0, a realistically unobtainable condition.

Consider now in more detail the operation of the diagram of FIG. 4. The tapped delay line 324 can be formed of a number of turns of coaxial cable with each turn having a tap thereon such as output taps 370, 371, and 372. There can be, for example, $M-2$ such turns where M can equal 100 so that there would be $M-1$ taps extending therefrom and leading to commutator 305. The commutator 305 responds to a clock input on lead 346 and derived from computer 322, which can be a microprocessor, to commutate the connection of output taps 370–372 to output terminal 307 of commutator 305 in a continuous and cyclical manner.

The chip clock pulses $C_m$ are supplied to the input of tapped delay line 324 via lead 358. Thus, by successively connecting output taps 370–372 to the output lead 307 of commutator 305 the chip clock $C_m$ input is, in effect, phase shifted each time a successive tap output is connected to output terminal 307 of commutator 305. A continuous phase shift of a signal is equivalent to a frequency change so that the frequency of chip clock $C_m$ can be altered. The signal appearing on output terminal 307 of commutator 305 (now chip clock $C_G$) is supplied to transmitter 218 of FIG. 3, and is related to the phase of chip clock $C_m$ in that when it (chip clock $C_G$) is transmitted to and received back from the satellite by receiver 212 it is synchronized with the received chip clock $C_m$. The count value accumulated in accumulator 315 will then theoretically become 0 and the rate of the clock pulse supplied to commutator 305 will become 0. However, due to many factors such theoretical phase synchronization is not likely to occur and a certain amount of hunting for phase synchronization will always be present, as indicated by the time vs. phase difference curve of FIG. 7. It should be noted that commutator 305 of FIG. 4 can commutate at a very slow rate down to 0 and extending up to a very high rate where the frequency of the chip clock signal $C_{Gr}$ can be changed by many clock pulses per second so that the phase adjustment between the chip clock pulses and $C_m$ chip clock pulses $C_{CG}$ can be very fast, but with great sensitivity.

The chip clock $C_m$, which is generated at the output of receiver 210 of FIG. 3, in addition to being supplied to tapped delay line 324 is also supplied to one input of phase detector 330, the set input of flip-flop 351, and to the clock input 350 of counter 360.

The phase detector 330 is part of a phase locked loop (PLL) circuit 308 which also includes low pass filter 332, VCO 336 and frequency divide-by-X logic 334. The purpose of PLL 308 is to generate a high frequency output from VCO 336 which is supplied via AND gate 310 to counter 312. The frequency of the output of VCO 336 is determined by the value of X in the divide by X circuit 334 and can be, for example, 100. Thus the output frequency of VCO 336 is 100 times the chip pulse $C_m$ rate.

The purpose of the logic within dashed line block 364 is to generate a digital value which can be either plus or minus and is supplied to microprocessor 322 through AND gate 318. This digital value, which is a count value generated in counter 312 and accumulated in accumulator 315, is interpreted by the microprocessor 322 which will respond thereto to produce a variable rate clock signal on output lead 346 which is supplied to the clock input 345 of commutator 305 to cause output taps 370, 371–372 of tapped delay line 324 to be connected to output terminal 307 of commutator 305 at a given rate and in a given direction. More specifically, commutator 305 is capable of connecting taps 370, 371–372 to output terminal 307 in the order given above or in the opposite order, that is to say, successively to taps 372, 371 and, 370 and, of course, the ones not shown in-between taps 372 and 371. The direction of operation of commutator 305 is determined by a direction indicating signal supplied from microprocessor 322 to commutator 305 via lead 343.

Figure 5:
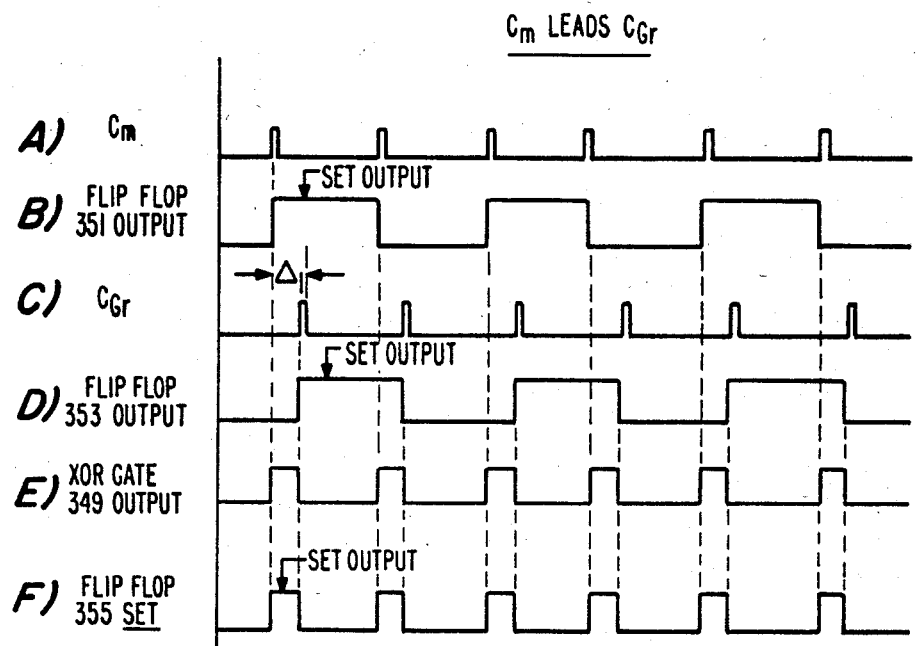
FIGS. 5 and 6 are time charts illustrating the phase corrections made to the PRS signals generated at the ground station.

The operation of the logic within the block 364 will now be discussed with the aid of the timing waveforms of FIGS. 5 and 6. For purposes of brevity, the timing waveforms of FIGS. 5 and 6 will be referred to herein as waveform 5B or waveform 6A rather than as waveform A of FIG. 5 or waveform A of FIG. 6.

The pulse trains $C_m$ and $C_{Gr}$ are connected respectively to the set inputs of flip-flops 351 and 353 and also connected respectively to the set and reset inputs of flip-flop 355. The outputs of flip-flops 351 and 353 are shown in waveforms 5B and 5D when $C_m$ leads $C_{Gr}$ in phase, as shown in waveforms 5A and 5C. The output of XOR gate 349 is shown in waveform 5E and consists of a high level signal when the input signals are unequal and a low level signal when the inputs are equal in accordance with the characteristics of an XOR gate.

The aforementioned positive pulses, represented by a single pulse 347 in FIG. 4, is supplied to one input of AND gate 310 to enable AND 310 and to allow pulses from VCO 336 to pass therethrough and to up/down counter 312 for the duration of pulses 347. It is evident that the number of pulses supplied to counter 312 depends on the width of pulse 347 which in turn depends upon the phase difference $\Delta\phi$ between $C_m$ and $C_{Gr}$.

The supplying of said train of pulses to counter 312 is not by itself sufficient, however. A polarity sign also must be supplied to counter 312 in accordance with whether $C_m$ is leading or lagging $C_{Gr}$ so that counter 312 will count respectively up or down. Such polarity is determined by the output of flip-flop 355. If $C_m$ leads $C_{Gr}$, as is the case shown in the waveforms of FIG. 5, then the set output of flip-flop 355 will be high during the period of the high level outputs from XOR gate 349, as shown in waveforms of 5E and 5F. Since the set output of flip-flop 355 is supplied to the count-up input of counter 312 the counter 312 will count up during the high level output pulses from XOR gate 349.

The counter 312 is always set or reset to a value Z at the trailing edge of the output pulses from XOR gate 349 so that the next subsequent count value supplied to counter 312 will cause counter 324 to begin counting from a value of Z, either up or down. The latch 317 also contains a value Z which is subtracted from the final count value of counter 312 by subtract logic 313. Thus, the output of substract logic 313 is the difference between Z and the final count contained in counter 312 and will have a polarity sign thereon indicated by the most significant bit (MSB) of the output of subtract logic 313. Such difference count value is accumulated in accumulator 315 for each pair of chip clock pulses $C_m$ and $C_{Gr}$.

Figure 6:
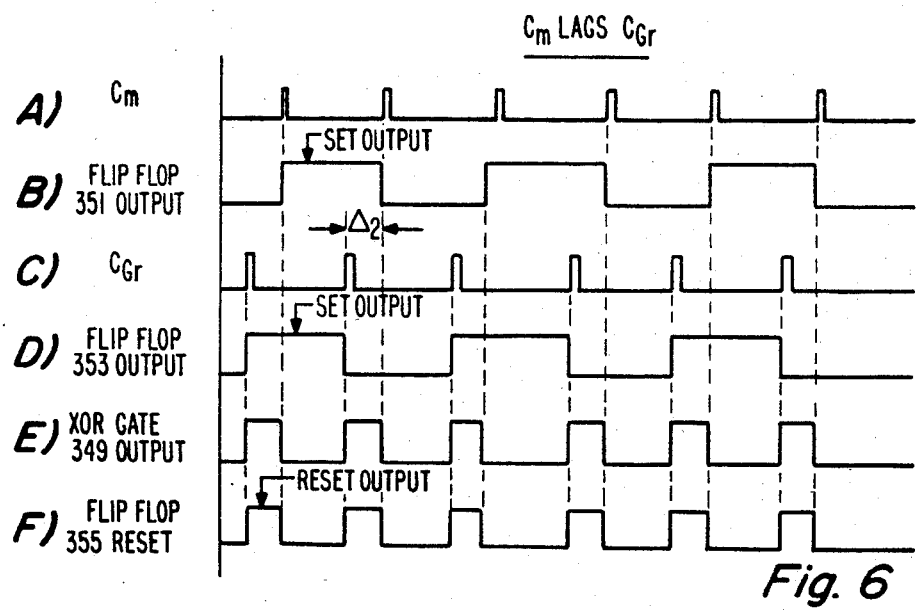

The operation of the logic when $C_m$ lags $C_{GR}$ is shown in the timing waveforms of FIG. 6. Here again the outputs of flip-flops 351 and 353 are represented by waveforms 6B and 6D with XOR gate 349 responding to conditions of different level output signals from flip-flops 351 and 353 to produce the train of output pulses shown in waveform 6E. However, in the case where $C_m$ lags $C_{Gr}$, $C_{Gr}$ occurs first so that flip-flop 355 is reset during the output pulses from XOR gate 349 as indicated in waveform 6F. Thus the reset output of flip-flop 355 is high and instructs counter 312 to count down during the time that the output of XOR gate 349 is high. The flip-flop 351 is set by the next occurring $C_m$ clock pulse, terminating the output pulse from XOR gate 349 and also the train of pulses supplied to counter 312 through AND gate 310.

The contents of counter 312 are then read out to subtract logic 313 by the trailing edge of the output pulse 347 from XOR gate 349. Such subtract logic 331 next subtracts the output of counter 312 from the value Z in latch 317 to produce a positive difference which is supplied to accumulator 315. The accumulator 315 is enabled by the pulse 347 after being delayed in delay logic 309 to permit the settling down of the logic computing the difference value.

When counter 360 reaches its count capacity, which it does every 1/10 of a second, AND gate 318 is enabled to transfer the total count value accumulated in accumulator 315 for the prior 1/10 second to microprocessor 322. Microprocessor 322 responds to such total count value and its polarity sign to generate a clock rate signal on output lead 346 and a polarity sign signal on its output lead 343. Such signals are supplied to the clock input and the direction input of commutator 305 to control its rate of commutation and also the direction thereof in the manner described hereinbefore.

The bit clocks $B_m$ and $B_{Gr}$ are also supplied to microprocessor 322 via leads 352 and 356 respectively, and after phase synchronization has been obtained between $C_m$ and $C_{Gr}$ computes the difference in time between the received bit clocks of $B_m$ and $B_{Gr}$ and then alters the occurrence of bit clock $B_r$ supplied to transmitter 218 of FIG. 3 by that amount of time so that when $B_G$ is transmitted back from the satellite as $B_{Gr}$ it will be in phase with $B_m$ at the outputs of receivers 210 and 212 of FIG. 3.

The changing of the timing of $B_{Gr}$ is done by resetting counter 340 (FIG. 4) to 0 by a signal from computer 322 via lead 338. It is to be noted that $B_G$ supplied to transmitter 218 is not in phase with $B_{Gr}$ (which is $B_G$ returned from the satellite) nor is it in phase with $B_m$ appearing at the output of receiver 210 of FIG. 3. $B_G$ has a phase such that when it returns from the satellite it (now $B_{Gr}$) will be in phase with $B_m$ at the output of receiver 210 of FIG. 3.

Figure 7:
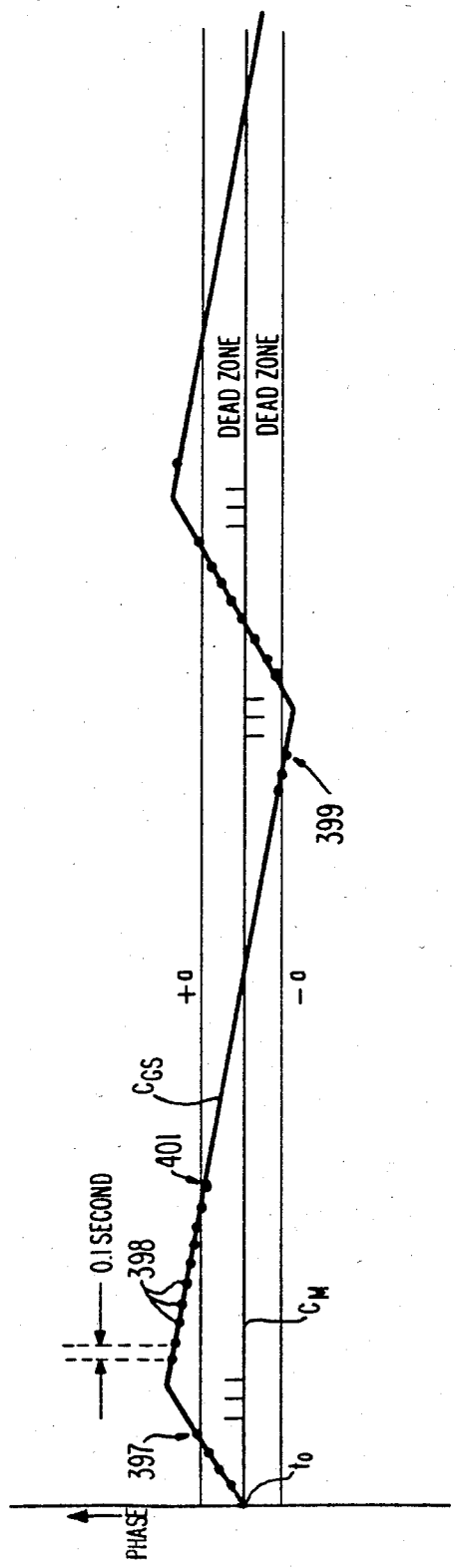
FIG. 7 is a curve showing chip phase difference vs. time of $C_{Gr}$ and $C_m$.

Referring now to FIG. 7 there is shown a typical case history of how the phase difference $\Delta\phi$ between $C_m$ and $C_{Gr}$ would vary in time. The diagram of FIG. 7 shows phase vs. time where the small intervals marked off by the dots such as dots 398 represent time periods of 1/10 of a second. The system is shown starting with a phase error of 0 at time $t_0$. For the case shown, the chip clock $C_{Gr}$ as first received is running slightly ahead of chip clock $C_m$. To give a feel to the time scale it should be noted that the maximum frequency shift caused by Doppler (i.e., satellite motion-caused) is about one part in $10^8$. Hence if the chip rate is 10 MHz the maximum difference between $C_m$ received and what must be provided to the transmitter 218 is 0.1 Hz.

The function of the tracking software, shown in FIG. 8 and to be described later, is to keep the phase in the dead zone as being between lines +a and −a. Such dead zone is defined as a phase difference which is acceptable to the system. Every 1/10 of a second the phase is measured and if it is in the dead zone no action is taken.

As soon as the first measurement is taken where the phase is out of the dead zone (in this case slightly higher than +a) the microprocessor 322 (FIG. 3) takes steps to decrease the frequency of $C_G$ in order to reduce the phase error. Such action is commanded by the microprocessor 322 at the first arrow 397 shown in FIG. 7. The processor will subsequently ignore all phase difference inputs ($\Delta\phi$) from accumulator 315 for the next 4/10 of a second (shown by the three tick marks along the horizontal time access). The foregoing occurs since about 0.25 seconds are required for a phase change executed at the transmitter to make the round trip to the satellite and return back to the receiver. Subsequently, 0.4 seconds after the original phase change at the transmitter, the phase difference is examined again and it is sampled and examined continuously thereafter every 1/10 second (until a new phase change is made). The successive phase differences are measured to ensure that the phase direction is now trending downward back toward the dead zone. As long as the phase is decreasing towards the dead zone no further action is executed by microprocessor 322, as will be seen in the discussion of FIG. 7. Eventually, however, the decrease in phase of $C_G$ will cause the phase difference to go below +a and into the dead zone. The phase is still continuously monitored thereafter but no action is taken as long it remains in the dead zone.

Eventually, however, the phase error will fall below the line −a shown at the time indicated by arrow 399 in FIG. 7. At this time action is again taken by microprocessor 322 (FIG. 3) which realizes that the frequency of $C_G$ must be increased to reduce the phase error back toward 0. Such action is taken but no monitoring of the results occurs during the next 0.4 seconds. Once monitoring of the phase begins again no further action is taken until the phase error exceeds +a. Action of the foregoing type continues indefinitely. The phase continues to increase until the frequency $C_G$ is decreased at which time the phase decreases back towards the dead zone. Thus, the phase continually oscillates within or just above or below the dead zone and the resulting phase error remains far less than 180°. The details of the foregoing tracking procedure as controlled by microprocessor 322 is shown in the flow chart of FIG. 8 which is described hereinafter.

It should be noted at this point that the operation of the system has two modes; the acquisition mode in which chip and bit phase synchronism is initially acquired, and the tracking mode in which chip and bit synchronization is maintained. In the following discussion of the flow diagram of FIG. 8 it is assumed that phase synchronization of bit and chip phase synchronization has been attained and that the system is in the tracking mode. Following a discussion of the flow chart of FIG. 8 a discussion of flow chart of FIG. 9 will be set forth, which describes the acquisition mode.

Figure 8:
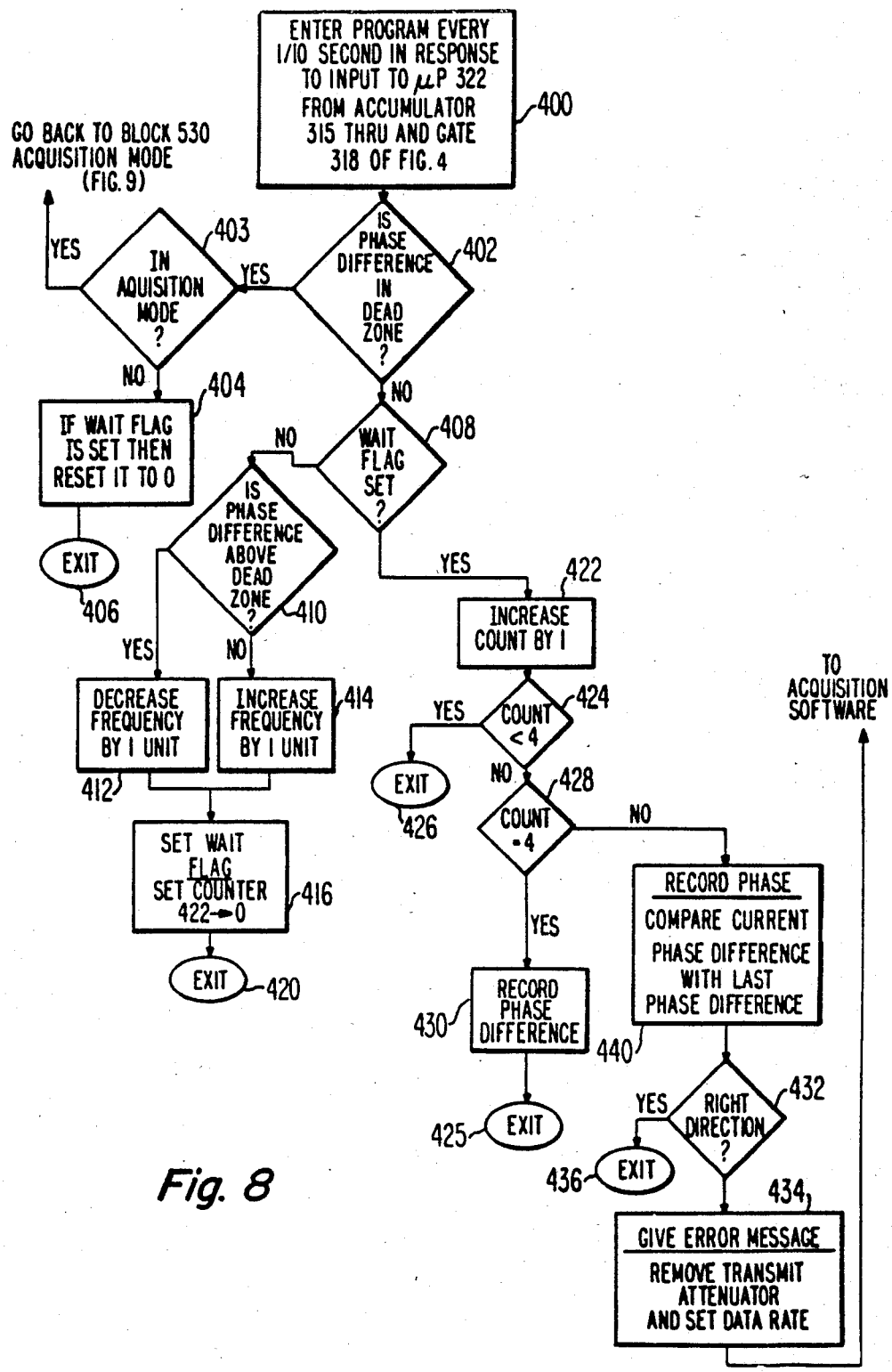
FIG. 8 is a flow chart of the method employed to control the phase differences shown in FIG. 5 during the steady state mode of operation (the track mode)

The operation represented by the flow chart of FIG. 8 is entered into every 1/10 second in response to the input supplied from accumulator 315 through AND gate 318 every 1/10 second, as indicated by block 400 of FIG. 8. A decision is made as to whether the phase difference ($\Delta\phi$) between $C_m$ and $C_{Gr}$ is within the dead zone, as determined by the count value supplied from accumulator 315 and as also indicated by decision block 402 of FIG. 8. If in the dead zone a wait flag, which can be a single bit in a known register or memory location in processor 322, is reset to 0 and the program is exited, as indicated in block 406. This program is then re-entered at block 400 at the end of 1/10 second when another count value is supplied from accumulator 315 to processor 322 of FIG. 4.

Assume now that the phase difference has moved out of the dead zone so that the logic moves to decision block 408 which determines if the wait flag is set. If not, then the logic moves to the decision block 410 which determines if the phase is above the dead zone or not. If it is above the dead zone, then the signal is processed, as indicated in block 412, by decreasing the frequency of $C_G$ by one unit. One unit of frequency is a predetermined amount corresponding to an amount larger than the maximum possible frequency shift. In the foregoing example where the chip rate is 10 MHz and the maximum frequency shift is 0.1 Hz a unit might corresponding to 0.1 Hz or more depending on the detailed design. Next, the wait flag is set as indicated in step 416 and also the counter 422 is set to 0. The counter 422 can be another register or memory location in processor 322 of FIG. 4. Going back now to decision block 410, if the phase is not above the dead zone then it must be below the dead zone because it was determined in block 402 that the phase was not in the dead zone. Step 414 then functions to increase the frequency by one unit, set the wait flag and also set counter 422 to 0.

One-tenth second later the next count value is supplied to computer 322 from accumulator 315 of FIG. 4 and the logic of FIG. 8 steps through blocks 402 and 408 to block 422 since the wait flag was set in the prior running of the logic. The block 422, as mentioned above, represents the incrementing of the counter, and its count is increased by an increment of 1. The logic then checks the accumulated value in counter 422 and, if it is less than 4 exits via exit block 426. One-tenth second later the program is again re-entered and processes the signal through steps 402, 408, 422, and 424 to exit 426 since the count is now only 2 (less than 4).

Eventually, 2/10 second later, the count in 422 becomes 4 so that decision block 424 directs the logic to the decision block 428 which recognizes that counter 422 contains a count of 4 and therefore records the phase difference, as evidenced by the last count value supplied from accumulator 315 to processor 322 in FIG. 4, and then exits via exit step 425.

One-tenth second later, the logic of FIG. 8 will again be entered via step 400 and the signal processed through steps 402, 408, 422, 424 and into decision block 428. Since the count is now 5 the program will go to the instruction indicated by block 440 and record the phase difference, i.e., the latest count value accumulation supplied from accumulator 315 and also will compare such latest recorded phase difference ($\Delta\phi$) with the phase difference (count value) recorded in the prior execution of the logic by the step of block 440.

The absolute value of the two recorded phase differences must be decreasing in order for the system to be correcting the phase difference in the proper direction. Therefore, if the count value (the last recorded phase difference) done by step 430 is less than the phase difference recorded by step 440 then the logic is exited via exit block 436, the program is re-entered 1/10 second later, and the entire process is repeated. If the last recorded phase count value (the last recorded phase is greater than the phase recorded by step 440 the logic indicates that the phase error is growing and that the system is malfunctioning. Accordingly, block 434 is entered and the logic energizes alarm equipment indicating the malfunction.

Figure 9:
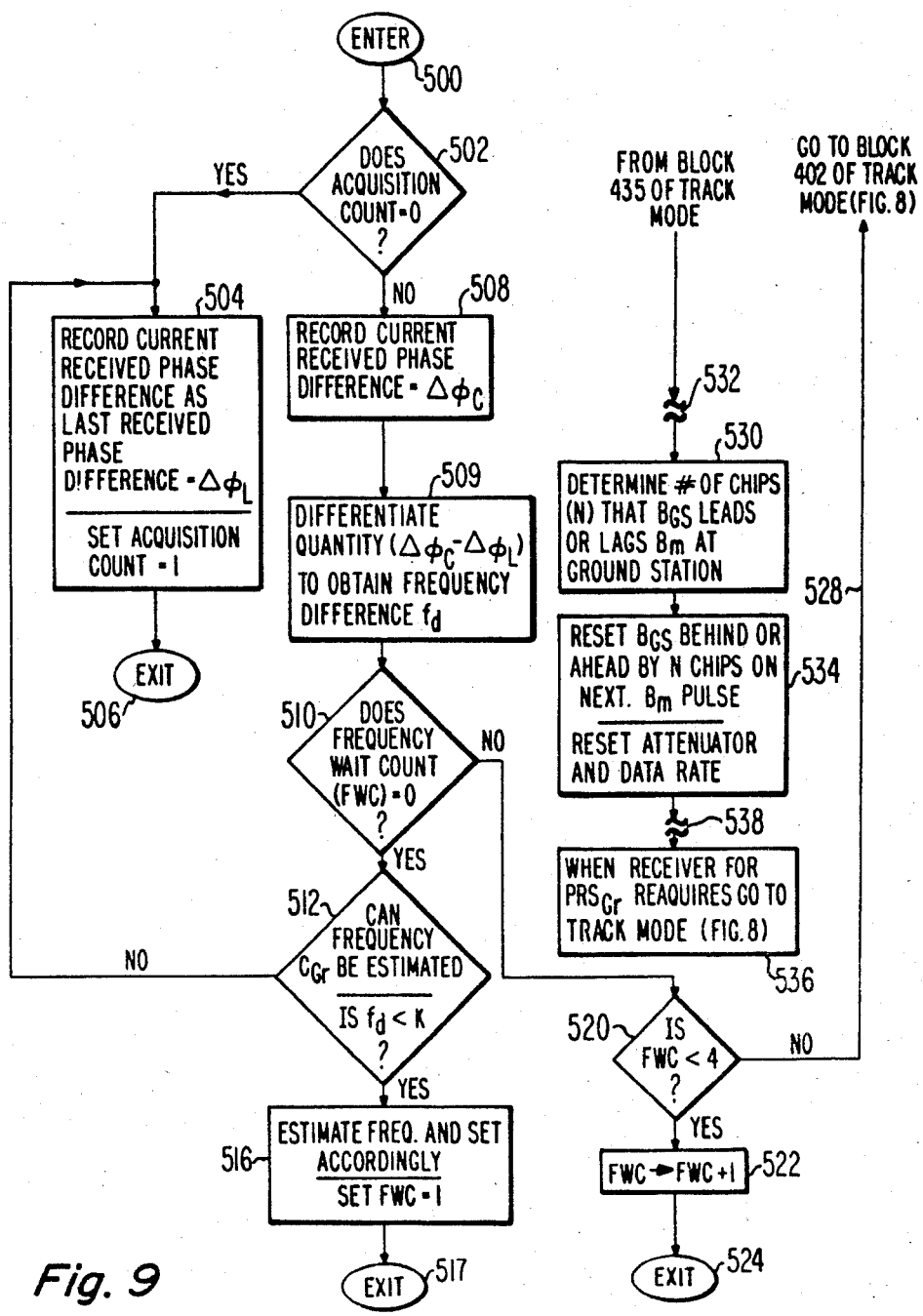
FIG. 9 is another flow chart showing the method of initially acquiring chip and bit synchronization in the system after it is initially activated.

When the equipment is initially turned on, it is necessary to obtain initial synchronization between $C_m$ and $C_{Gr}$ and between $B_m$ and $B_{Gr}$. During this initial period, identified as the acquisition period the steps outlined in the flow chart of FIG. 9 are employed. The first step, after entry into block 500, is to check the acquisiton count in a designated acquisition counter in decision block 502. If such count is 0, then the signal (attenuated for reasons to be discussed later) is processed as indicated in block 504 by recording the received phase difference, designated as $\Delta\phi_L$, and which is the difference between the $C_m$ and $C_{Gr}$ in terms of a value which is representative or, in the present case, indicates directly the phase difference $\Delta\phi_L$ in degrees. The program then exits through block 506 and re-enters block 500 1/10 second later. During the next execution of the logic of FIG. 9 the acquisition count is 1 and the currently received phase different $\Delta\phi_C$ is recorded as shown in block 508. Next, as shown in block 509, the difference between $\Delta\phi_L$ and $\Delta\phi_C$ is taken to obtain the frequency difference $f_d$. It will be noted that the rate of change of phase is the definition of frequency.

Next, in decision block 510 the frequency wait count (FWC) is checked. If FWC is 0, then the logic moves to decision block 512 which determines if the frequency of $C_{Gr}$ can be estimated, which determination depends on the value $f_d$. If $f_d$ is less than some predetermined frequency K then the response is yes and the frequency is estimated as shown in block 516, and the frequency wait count (FWC) is set equal to 1. The program then exits through block 517 and re-enters block 500 1/10 second later.

If the frequency cannot be estimated because $f_d$ is greater than K, as indicated in decision block 512, then the currently received phase dfference $\Delta\phi_C$ is stored, as indicated in block 504, and becomes the new last received phase difference $\Delta\phi_L$.

This process continues with each new current received difference $\Delta\phi_L$ becoming the last received phase difference $\Delta\phi_L$ and differentiation of the quantity $\Delta\phi_C$ minus $\Delta\phi_L$ calculated until $f_d$ is less than K and the frequency can be estimated.

The reason for not acting on changes that are too large is that such phase changes are mathematical rather than real. For example, if $\Delta\phi_L = -181°$ and $\Delta\phi_C = +179°$ the numerical phase change is large but in reality it is only 2°. Instead of acting the system waits until it has moved away from this discontinuity.

The next time the loop of FIG. 9 is processed the decision block 510 will note that FWC is equal to 1 and the logic will go to decision block 520 where it will be determined if FWC<4. If less than 4 then the logic will go to block 522 where FWC is incremented and the logic exited via block 524 to re-enter block 500 1/10 second later.

The foregoing process is continued until FWC=4 at which time decision block 520 will direct the logic to go to block 402 of the track mode of FIG. 8. The signal will then be processed in exactly the same manner as discussed in connection with the discussion of FIG. 8 unitl the phase differece $\Delta\phi$ between $C_m$ and $C_{GS}$ enters the dead zone as indicated by decision block 402. Under such circumstance the decision block 403 will recognize that the system is in the acquisition mode and will direct the program to go back to block 530 of the acquisition mode of FIG. 9.

Blocks 530, 534, and 536 of FIG. 9 will synchronize $B_m$ with $B_{Gr}$. More specifically, after allowing for a round trip transit time to the satellite and back to the ground station, indicated by break 532, The block 530 will determine the number of chips (N) that $B_{Gr}$ leads or lags $B_m$ at the ground station. This is done simply by counting the number of chip periods that occur between $B_m$ and $B_{Gr}$.

The bit clock pulse phase is then reset by that number of chip periods either behind or ahead of $B_m$ at the next $B_m$ clock pulse so that when $B_G$ is transmitted to the satellite and returned as $B_{Gr}$ it will be in phase with $B_m$ (at the ground station). Also, as indicated in block 534 an attenuator 220 of FIG. 3 is removed from the circuit and the data rate is reset. Next, after another round trip transit time or, more precisely after another 0.4 second has passed, as is indicated by break 538, the block 536 directs the logic to enter the track mode of FIG. 8.

It is to be noted, that the attenuator 220 of FIG. 3 is provided to lower the energy level during acquisition so that it will not interfere significantly with on-line transmission and reception by other stations. To provide increased signal-to-noise ratio, and thereby compensate for the lower energy level the number of chips in the PRS signal can be increased.

Figure 10:
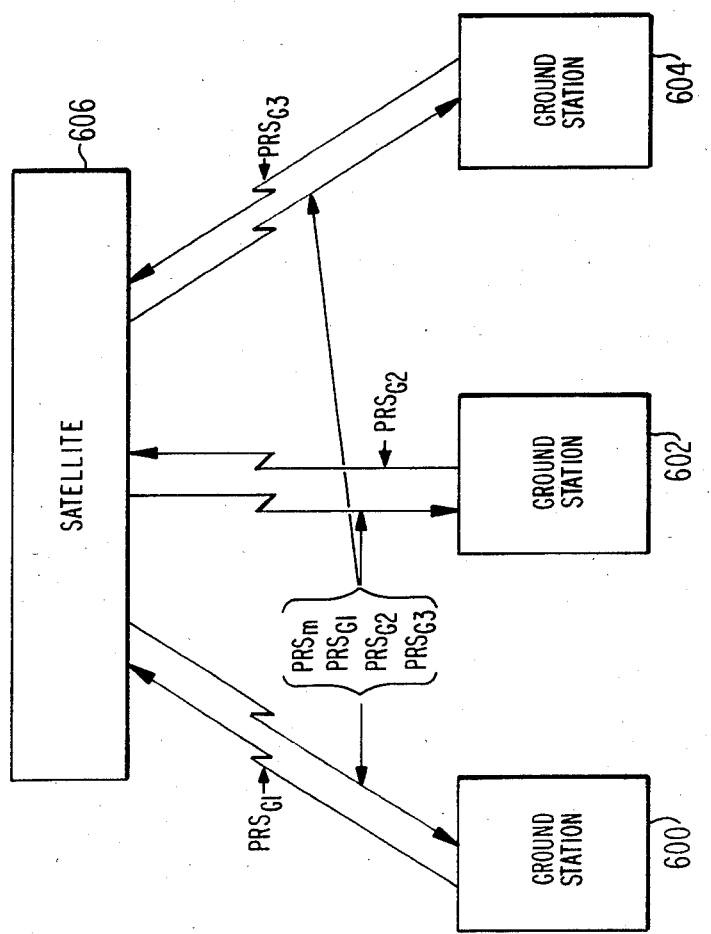
FIG. 10 is a broad diagram of the overall system.

As indicated throughout the specification, the overall system in effect connects together a number of ground stations via a common satellite. This overall arrangement is shown broadly in FIG. 10 wherein ground stations 600, 602, and 604, each constructed like the one shown in FIG. 3, are interconnected together via satellite 606. Each ground station transmits a PRS signal unique thereto and receives from satellite 606 the unique PRS signals ($PRS_{G1}$, $PRS_{G2}$ and $PRS_{G3}$) transmitted to the satellite from all of the three ground stations 600, 602, and 604, and, in addition, receives the master PRS signal ($PRS_m$) which originates in the satellite 606.

I claim:

1. A communication system, employing a satellite which continuously and interatively re-transmits a pseudo-random sequence signal $PRS_m$ having a chip rate $C_m$ and a bit rate $B_m$, said system comprising:

a plurality of ground stations each having a transmitter and a receiver;
means for transmitting a first pseudo-random sequence signal $PRS_G$ having a first chip rate $C_G$ and a first bit rate $B_G$ from at least one ground station to said satellite;
means at said at least one ground station for receiving and identifying $PRS_G$ after being returned by said satellite as $PRS_{Gr}$ with a chip rate $C_{Gr}$;
means at said at least one ground station for receiving and identifying $PRS_m$;
means responsive to the phase difference between $C_m$ and $C_{Gr}$ to produce a signal value representative thereof every time period $\tau$; and
means responsive to said signal value to change the chip rate $C_{Gr}$ by an amount which will cause the phase of $C_{Gr}$ to approach the place of $C_m$ at a rate which will approximate the phase of $C_m$ at the end of the next time period $\tau$.

2. A communication system employing a satellite which continuously and iteratively re-transmits a pseudo-random sequence signal having a chip rate $C_m$ and a bite rate $B_m$, said system comprising:

a plurality of ground stations each comprising:
means for transmitting a first pseudo-random sequence signal $PRS_G$ unique thereto and have a first chip rate $C_G$ and a first bit rate $B_C$ and for receiving and identifying $PRS_G$ after being returned by said satellite as $PRS_{Gr}$ with a chip rate $C_{Gr}$ and a bit rate $B_{Gr}$;
means responsive to $C_m$ and $C_{Gr}$ to periodically produce a signal representative of the phase difference therebetween; and
means responsive to said signal to change the phase of $C_G$ in a direction which will cause the phase of $C_{Gr}$ to approach the phase of $C_m$.

3. A receiver in a communications system employing a satellite for receiving and retransmitting pseudo random sequence (PRS) signals from said receiver and having logic for iteratively transmitting master PRS signal $PRS_m$ having a chip rate $C_m$ and a bit rate $B_m$, said receiver comprising:

means for transmitting a first PRS signal $PRS_G$ having a first chip rate $C_G$ and a first bit rate $B_G$;
means for receiving and identifying $PRS_G$ after being returned by said satellite as $PRS_{Gr}$ having a chip rate $C_{Gr}$ and a bit rate $B_{Gr}$;
means for receiving and identifying $PRS_m$;
means responsive to $C_{Gr}$ and $C_m$ to produce a signal representative of the phase difference therebetween every time period $\tau$;
means responsive to successive phase differences between $C_{Gr}$ and $C_m$ to determine the frequency difference between $C_{Gr}$ and $C_m$; and
means responsive to said frequency difference to change the chip rate $C_{Gr}$ by an amount which will cause the phase of $C_{Gr}$ to change by an amount which will cause the phase of $C_{Gr}$ to approach the phase of $C_m$ at a given rate.

4. In a commmunication system employing at least one ground station and a satellite having a transponder for receiving and re-transmitting pseudo random sequence (PRS) signals transmitted from said at least one ground station, and logic for iteratively transmitting a master PRS signal $PRS_m$ having a chip rate $C_m$ and a bit rate $B_m$, a method for synchronizing the chip and bit rate of the $PRS_m$ and the PRS signal retransmitted at said satellite and comprising the steps of:

transmitting from said at least one ground station a first PRS signal $PRS_G$ having a first chip rate $C_G$ and a first bit rate $B_G$;

receiving and identifying $PRS_G$ after being returned by said satellite as $PRS_{Gr}$ with a chip rate $C_{Gr}$ and a bit rate $B_{Gr}$;

receiving and identifying $PRS_m$ at said at least one ground station;

comparing the phases of $C_m$ and $C_{Gr}$ to produce a signal representative of the difference therebetween every time period $\tau$; and changing the chip rate $C_{Gr}$ in response to said signal by an amount and in a direction which will cause the phase of $C_{Gr}$ to appraoch the phase of $C_m$.

5. A commmuncation system as in claim 4 in which the step of comparing the phases of $C_m$ and $C_{Gr}$ comprises the steps of:

comparing $C_m$ and $C_{Gr}$ every time period $\tau$ to periodically produce a signal representative of the phase difference thereof; and computing the frequency difference between $C_{Gr}$ and $C_m$ by comparing the differences between successive phase differences of $C_{Gr}$ and $C_m$.

* * * * *